(12) United States Patent
Nonoyama et al.

(10) Patent No.: US 9,127,613 B2
(45) Date of Patent: Sep. 8, 2015

(54) FUEL PRESSURE WAVEFORM ACQUISITION DEVICE

(71) Applicant: DENSO CORPORATION, Kariya, Aichi-pref. (JP)

(72) Inventors: Yoshiharu Nonoyama, Nagoya (JP); Naoyuki Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 292 days.

(21) Appl. No.: 13/913,603

(22) Filed: Jun. 10, 2013

(65) Prior Publication Data

US 2013/0327300 A1 Dec. 12, 2013

(30) Foreign Application Priority Data

Jun. 12, 2012 (JP) ................................ 2012-132986

(51) Int. Cl.
*F02M 51/00* (2006.01)
*F02D 41/30* (2006.01)
*F02D 41/40* (2006.01)
*F02D 41/14* (2006.01)

(52) U.S. Cl.
CPC .............. *F02D 41/30* (2013.01); *F02D 41/402* (2013.01); *F02D 2041/1433* (2013.01); *F02D 2200/0602* (2013.01); *F02D 2200/0614* (2013.01); *F02D 2200/0618* (2013.01); *F02D 2250/04* (2013.01); *Y02T 10/44* (2013.01)

(58) Field of Classification Search
CPC ... F02D 41/30; F02D 41/402; F02D 2250/04; F02D 2200/0602; F02D 41/1433
USPC ................. 123/478, 480, 486, 490; 73/114.43
See application file for complete search history.

(56) References Cited

U.S. PATENT DOCUMENTS

| 8,640,670 | B2 * | 2/2014 | Yamada et al. ............... 123/299 |
| 2008/0228374 | A1 | 9/2008 | Ishizuka et al. |
| 2009/0063013 | A1 | 3/2009 | Nakata et al. |
| 2009/0319157 | A1 | 12/2009 | Ishizuka |
| 2011/0308497 | A1 | 12/2011 | Yamada et al. |

FOREIGN PATENT DOCUMENTS

| DE | 10 2011 053 426 A1 * | 3/2012 | ............... F02D 41/38 |
| JP | 2008-144749 | 6/2008 | |

(Continued)

OTHER PUBLICATIONS

Office Action (2 pages) dated Apr. 8, 2014, issued in corresponding Japanese Application No. 2012-132986 and English translation (2 pages).

*Primary Examiner* — Hai Huynh
(74) *Attorney, Agent, or Firm* — Nixon & Vanderhye P.C.

(57) ABSTRACT

A fuel injection system has a fuel injector and a fuel pressure sensor. An ECU acquires a pressure waveform detected by the fuel pressure sensor during performing a multi-stage injection as a detected waveform at the time of the multi-stage injection, memorizes a model waveform, which is used as a standard of the pressure waveform when an injection that is preceding an target injection is performed without performing the target injection when any one of an injection of a second stage or later of an injection is considered as the target injection among multi-stage injections, and extracts the pressure waveform resulting from the target injection by deducting the model waveform from the detected waveform at the multi-stage injection. The ECU corrects the model waveform used for extraction by a ratio according to a maximum injection rate in the injection of the preceding stage.

4 Claims, 10 Drawing Sheets

(56) References Cited

FOREIGN PATENT DOCUMENTS

| | | |
|---|---|---|
| JP | 2009-057924 | 3/2009 |
| JP | 2010-003004 | 1/2010 |
| JP | 2010-071187 | 4/2010 |
| JP | 2010-223184 | 10/2010 |
| JP | 2012-002173 | 1/2012 |

* cited by examiner

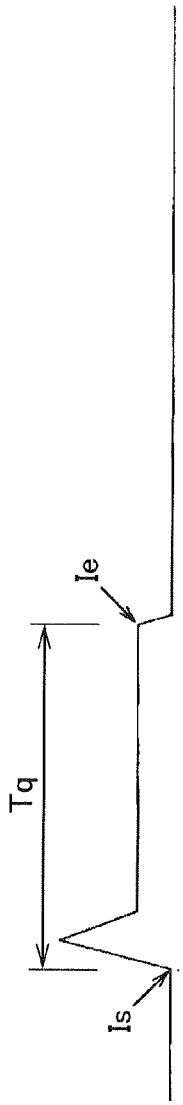
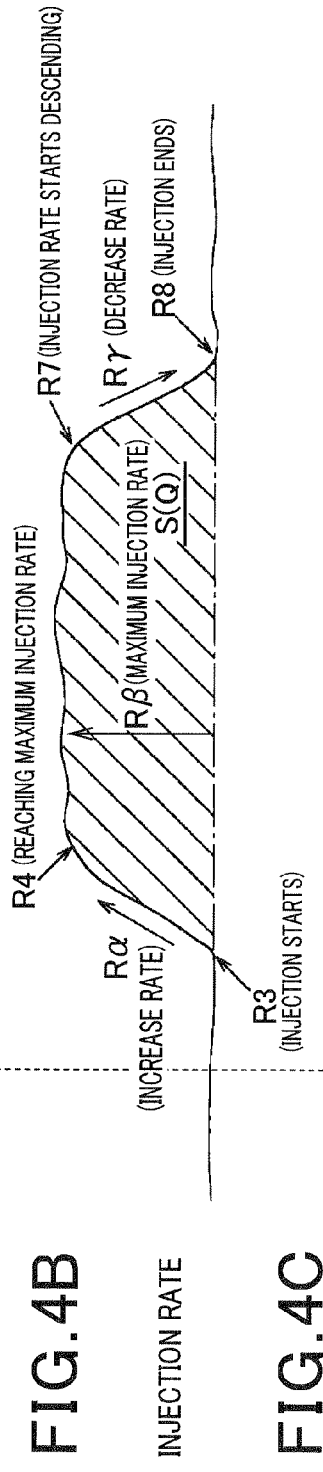
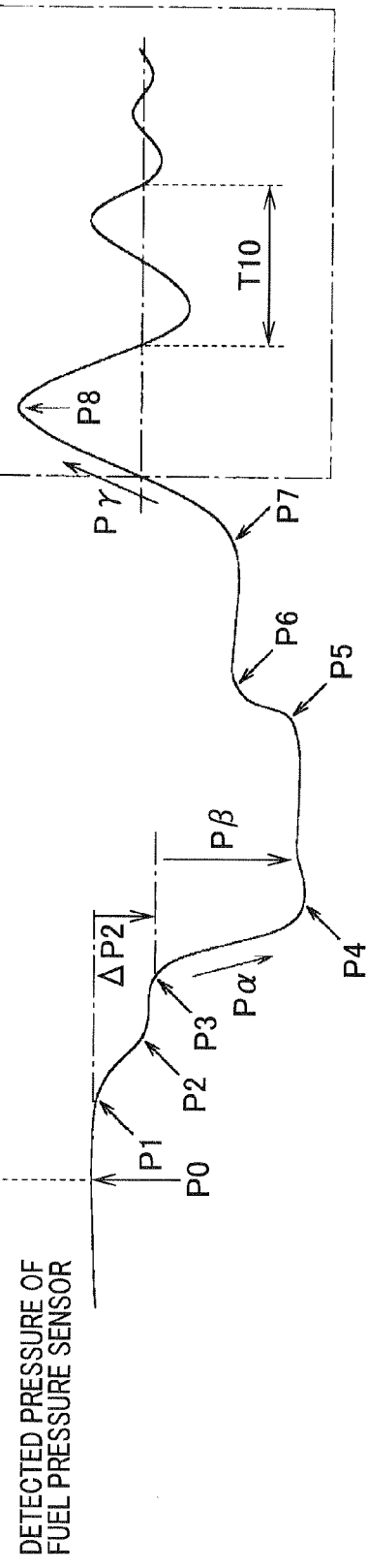
FIG. 4A DRIVING CURRENT
FIG. 4B INJECTION RATE
FIG. 4C DETECTED PRESSURE OF FUEL PRESSURE SENSOR FIG.5A DRIVING CURRENT
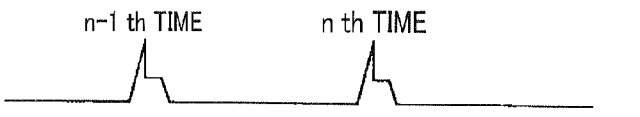
FIG.5B FUEL PRESSURE
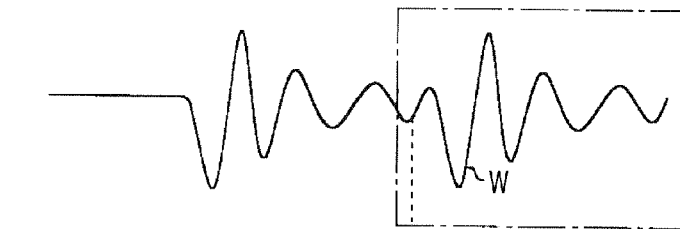
FIG.5C DRIVING CURRENT
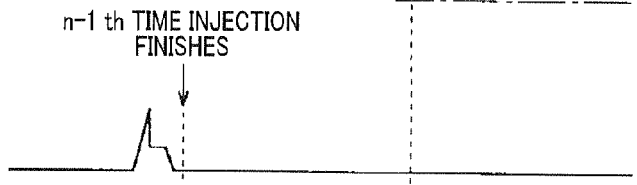
FIG.5D FUEL PRESSURE
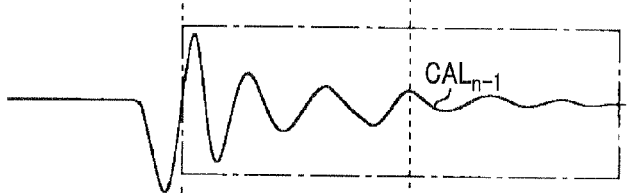
FIG.5E FUEL PRESSURE
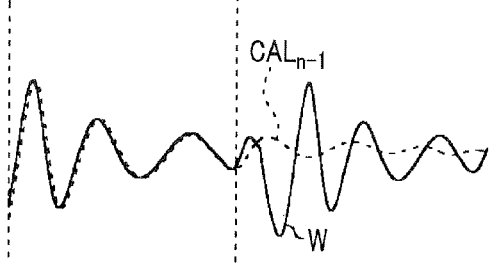
FIG.5F FUEL PRESSURE
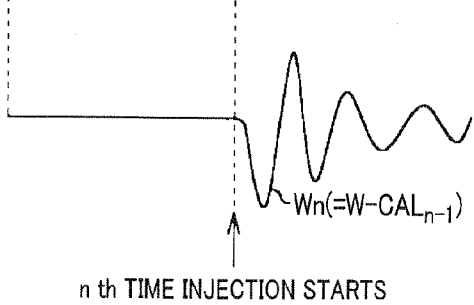

FIG.7A
FIG.7B
FIG.7C
FIG.7D
FIG.7E
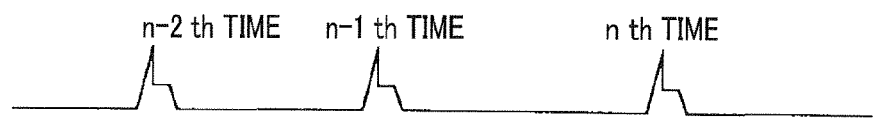
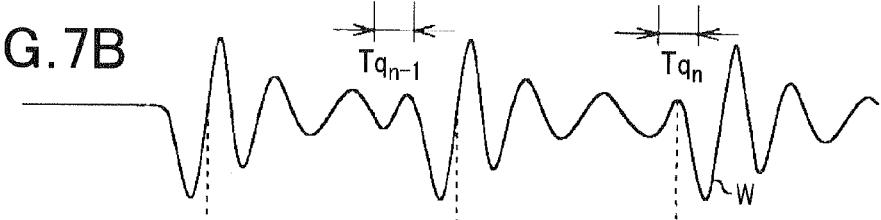
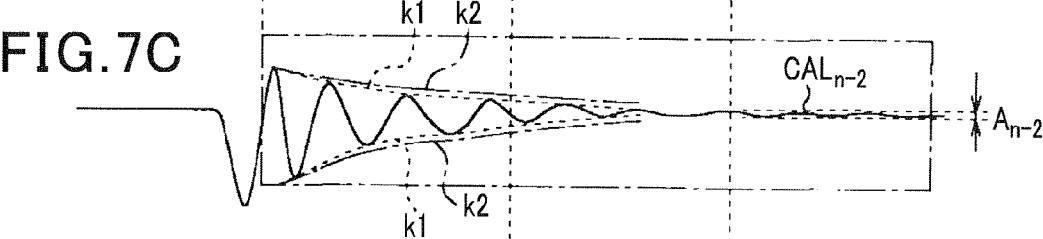
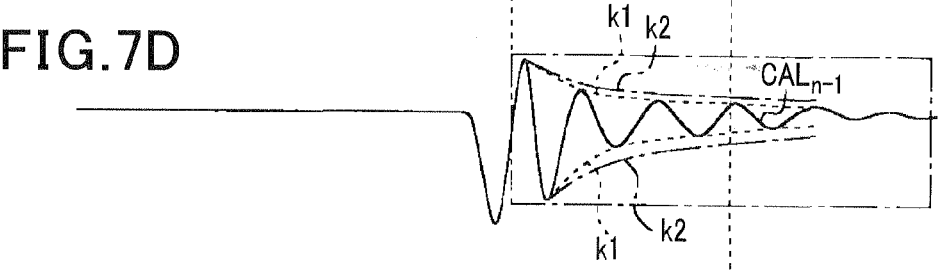
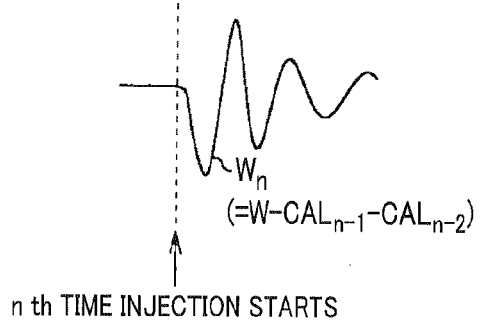

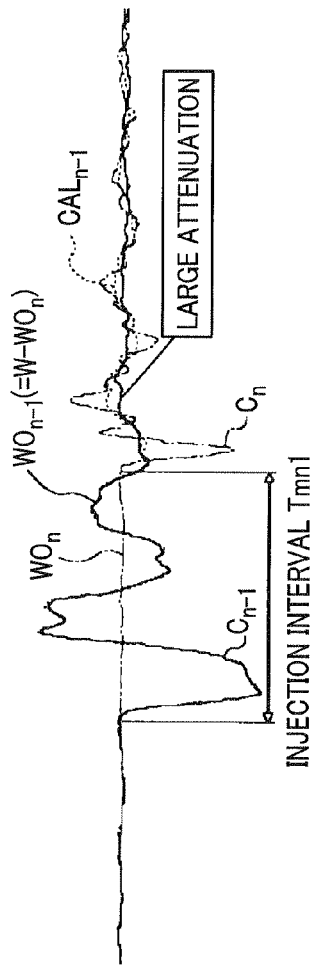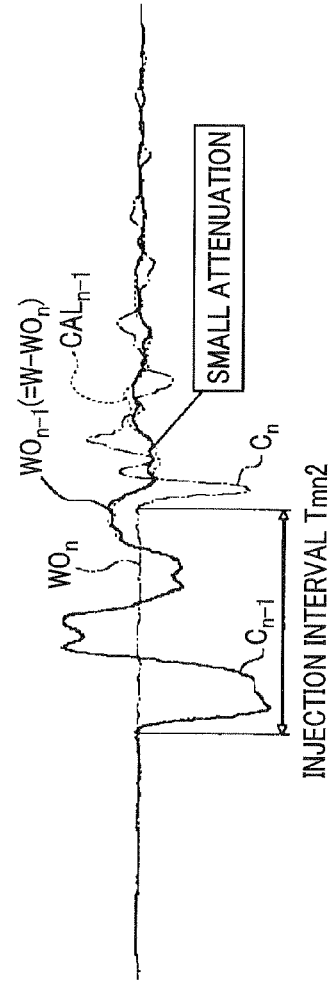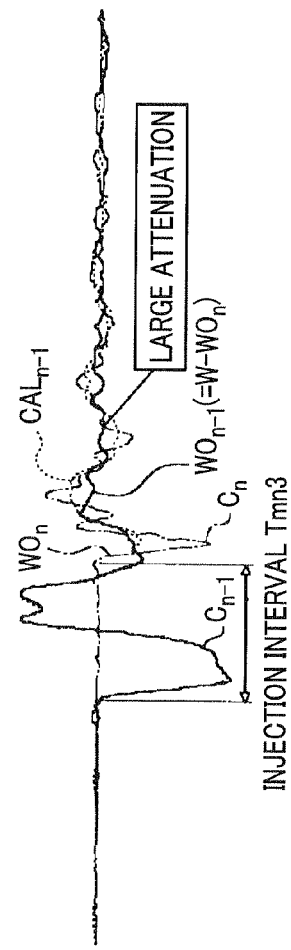
FIG.8A
FIG.8B
FIG.8C

FUEL PRESSURE WAVEFORM ACQUISITION DEVICE

CROSS-REFERENCE TO RELATED APPLICATION

The application is based on and claims the benefit of priority from earlier Japanese Patent Application No. 2012-132986 filed Jun. 12, 2012, the description of which is incorporated herein by reference.

TECHNICAL FIELD

The present disclosure relates to a fuel pressure waveform acquisition device. The acquisition device acquires a change of the fuel pressure, which arises in connection with injection of the fuel from a fuel injector of an internal-combustion engine, as a pressure waveform.

DESCRIPTION OF THE RELATED ART

In order to control an output torque and an emission condition of an internal-combustion engine with sufficient accuracy, it is important to control a condition of a fuel injection such as a fuel injection quantity, injection starting time, etc. of the fuel injected from an injection hole of a fuel injector with sufficient accuracy.

A fuel pressure in a fuel path to the injection hole changes resulting from the fuel injection, and by detecting a change of the fuel pressure by a fuel pressure sensor, an actual injecting condition is detected (refer to Japanese Patent Application Laid-Open Publications Nos. 2010-3004 and 2009-57924).

For example, an actual injection starting time is detected by detecting a time when the fuel pressure started descending by the injection.

Moreover, an actual injection quantity is detected by detecting a descending amount of the fuel pressure caused by the injection.

Thus, the injecting condition is controllable with sufficient accuracy if the actual injecting condition is detectable based on the detected value.

By the way, it is necessary to take notice of the following points when a multi-stage injection that injects the fuel a plurality of times per one combustion cycle is implemented.

That is, the tail of a waveform element resulting from an injection that is preceding a target injection is overlapped on a pressure waveform (detected waveform during the multi-stage injection) detected by the fuel pressure sensor during the multi-stage injection.

Therefore, in the above-mentioned Publication No. 2010-3004, a model waveform that expresses a pressure waveform of a preceding stage injection with a single stage in formula is memorized beforehand, and the pressure waveform (target waveform) resulting from the target injection is extracted by deducting the model waveform from the detected waveform at the multi-stage injection.

Then, the actual injecting condition is detected based on the extracted target waveform.

However, when the inventor of the present disclosure performed various examinations, it turned out that the pressure waveform resulting from the target injection may be unable to be extracted with sufficient accuracy if the injecting condition of the preceding stage changes.

SUMMARY

An embodiment provides a fuel pressure waveform acquisition device that considers any one of an injection of a second stage or later of an injection as a target injection among multi-stage injections, and extracts a pressure waveform resulting from the target injection from a detected waveform with high precision during the multi-stage injection.

In a fuel pressure waveform acquisition device applied to a fuel injection system that has a fuel injector that injects fuel for combustion in an internal-combustion engine from an injection hole, and a fuel pressure sensor that detects a change of a fuel pressure in a fuel path to the injection hole that changes resulting from the injection of the fuel from the injection hole according to a first aspect, the acquisition device includes a detected waveform acquisition device that acquires a pressure waveform detected by the fuel pressure sensor while performing a multi-stage injection that injects the fuel a plurality of times per one combustion cycle of the internal-combustion engine as a detected waveform at the time of the multi-stage injection.

The acquisition device further includes a model waveform memorizer where a model waveform, which is used as a standard of the pressure waveform when an injection that is preceding an target injection is performed without performing the target injection, is memorized when any one of an injection of a second stage or later of an injection is considered as the target injection among multi-stage injections, and a waveform extractor that extracts the pressure waveform resulting from the target injection by deducting the model waveform from the detected waveform at the multi-stage injection The acquisition device further includes a corrector that corrects the model waveform used for an extraction by a ratio according to a maximum injection rate in the injection of the preceding stage, or a ratio according to a correlation value of the maximum injection rate.

According to the composition mentioned above, the change of the fuel pressure in the fuel path to the injection caused by the fuel injection is detected by the fuel pressure sensor when the fuel injection is performed by the fuel injector.

Then, while the multi-stage injection is being performed, the pressure waveform can be acquired from the fuel pressure sensor.

When any one of the injection of the second stage or later of the injection is considered as the target injection among the multi-stage injections, the model waveform, which is used as the standard of the pressure waveform when the injection that is preceding the target injection is performed without performing the target injection, is memorized by the model waveform memorizer.

Further, the pressure waveform resulting from the target injection is extracted by deducting the model waveform from the detected waveform during the multi-stage injection.

It has been verified by the inventor of the present application that when the maximum rate of the injection in the preceding stage injection differs, the tail (pulsation of pressure) of the waveform element resulting from the preceding stage injection also changes.

In this respect, according to the composition mentioned above, the model waveform used for the extraction is corrected by a ratio depending on the maximum injection rate in the injection of the preceding stage, or a ratio depending on a correlation value of the maximum injection rate.

As a result, the pressure waveform resulting from the target injection can be extracted from the detected waveform during the multi-stage injection with high precision.

In the fuel pressure waveform acquisition device according to a second aspect, the larger the maximum injection rate in the injection of the preceding stage, the more the corrector enlarges the ratio.

In the fuel pressure waveform acquisition device according to a third aspect, wherein, the correlation value is a maximum descent amount of the fuel pressure in the pressure waveform resulting from the injection of the preceding stage, and the larger the correlation value, the more the corrector enlarges the ratio.

In the fuel pressure waveform acquisition device according to a fourth aspect, wherein, the correlation value is an amount of change of the fuel pressure at the time of the injection of the preceding stage by the pressure waveforms resulting from the injection before the injection of the preceding stage, and the corrector changes a ratio depending on the correlation value.

In the fuel pressure waveform acquisition device according to a fifth aspect, the corrector further corrects the model waveform used for the extraction to the waveform that is attenuated by an attenuating degree according to an injection interval from the injection of the preceding stage to the target injection.

In the fuel pressure waveform acquisition device according to a sixth aspect, the longer the injection period of the target injection, the more the corrector corrects the model waveform used for the extraction to the waveform with the larger attenuating degree.

BRIEF DESCRIPTION OF THE DRAWINGS

In the accompanying drawings:

FIG. 4A to FIG. 4C show time charts of a relation between a detected pressure waveform in a single stage injection execution time and an injection rate transition waveform;

FIG. 5A to FIG. 5F show time charts explaining processes of deleting undulation shown in FIG. 3;

FIG. 7A to FIG. 7E show time charts explaining processes of deleting undulation shown in FIG. 3;

FIG. 8A to FIG. 8C show time charts of a relation between an injection interval and a attenuating degree;

DETAILED DESCRIPTION OF THE PREFERRED EMBODIMENTS

With reference to the drawings, hereinafter will be described an embodiment that a fuel pressure waveform acquisition device is materialized.

The fuel pressure waveform acquisition device of the present embodiment is installed in an engine (internal-combustion engine) for a vehicle, and a diesel engine is assumed as the engine. The diesel engine has a system of injecting high-pressure fuel into a plurality of cylinders #1-#4 and the fuel in the cylinders is compressed to self-ignite and burn.

Figure 1:
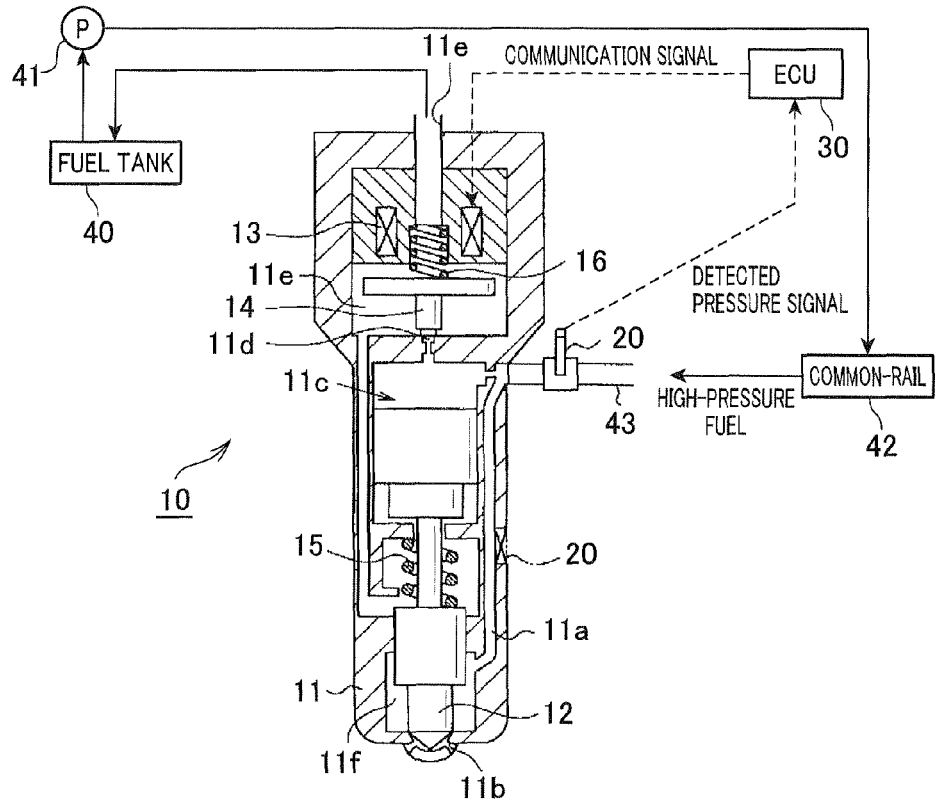
FIG. 1 shows a schematic diagram of a fuel injection system where a fuel pressure waveform acquisition device is applied.

FIG. 1 is a schematic diagram showing a fuel injector (fuel injection valve) 10 equipped in each cylinder of the engine (not shown), a fuel pressure sensor 20 equipped in the fuel injector 10, an ECU 30 that is an electrical control unit equipped in the vehicle, and the like.

In a fuel injection system of the engine including the fuel injector 10, the fuel in a fuel tank 40 is pressure-fed to a common-rail 42 (pressure accumulating container) by a high-pressure pump 41 and pressure-accumulated, and distributed and supplied to the fuel injector 10 of each cylinder via high-pressure piping 43.

The fuel injector 10 is constituted by having a body 11, a needle 12 (valve), an electromagnetic solenoid 13 (actuator), etc. explained below.

A high-pressure passage 11a is formed inside the body 11, and the fuel supplied to the fuel injector 10 from the common-rail 42 is injected from an injection hole 11b via the high-pressure passage 11a.

Moreover, some of the fuel in the high-pressure passage 11a circulates to a back pressure chamber 11c formed inside the body 11.

A leak hole 11d formed in the back pressure chamber 11c is opened and closed by a control valve 14, and the control valve 14 is operated for opening and closing the leak hole 11d by the electromagnetic solenoid 13.

While an elastic force of a spring 15 and the fuel pressure of the back pressure chamber 11c are applied to a valve-closing side of the needle 12, the fuel pressure of a fuel pooling section 11f formed in the high-pressure passage 11a is applied to a valve-opening side of the needle 12.

A fuel pressure sensor 20 that detects the fuel pressure is disposed in a fuel path (for example, the high-pressure piping 43 or the high-pressure passage 11a) from the common-rail 42 to the injection hole 11b.

The fuel pressure sensor 20 is disposed in a connecting section of the high-pressure piping 43 and the body 11 in an example shown in FIG. 1.

Or as shown in alternate long and short dash lines in FIG. 1, the fuel pressure sensor 20 may be disposed onto the body 11.

Moreover, the fuel pressure sensor 20 is disposed to each of the plurality of fuel injectors 10 (#1) to 10 (#4).

Function of the fuel injector 10 having the composition mentioned above is explained next.

A control valve 14 closes the leak hole 11d by the elastic force of a spring 16 when the electromagnetic solenoid 13 is not energized.

Then the fuel pressure in the back pressure chamber 11c rises and the needle 12 closes the injection hole 11b, thus the fuel injection from the injection hole 11b stops.

On the other hand, the control valve 14 resists the elastic force of the spring 16 and opens the leak hole 11d when the electromagnetic solenoid 13 is energized.

Then the fuel pressure in the back pressure chamber 11c falls and the needle 12 opens the injection hole 11b, thus the fuel is injected from the injection hole 11b.

Incidentally, when the fuel is injected by energizing the electromagnetic solenoid 13, the fuel that flows into the back pressure chamber 11c from the high-pressure passage 11a is discharged (leaked) from the leak hole 11d to a low-pressure passage 11e.

That is, the fuel in the high-pressure passage 11a is always leaking to the low-pressure passage 11e through the back pressure chamber 11c during a period when the fuel is injected.

The ECU 30 controls a fuel injecting condition by controlling the opening-and-closing movement of the needle 12 by controlling a drive (energization) of the electromagnetic solenoid 13.

For example, based on revolving speed of an engine output shaft, engine load, etc., target injection modes, such as injection starting time, injection ending time, and injection quantity, are calculated, and the electromagnetic solenoid 13 is controlled in order to reach the target injection modes.

Next, with reference to the flow chart shown in FIG. 2, hereinafter will be described a procedure that controls the fuel injecting condition by controlling the drive of the electromagnetic solenoid 13 by the ECU 30.

Figure 2:
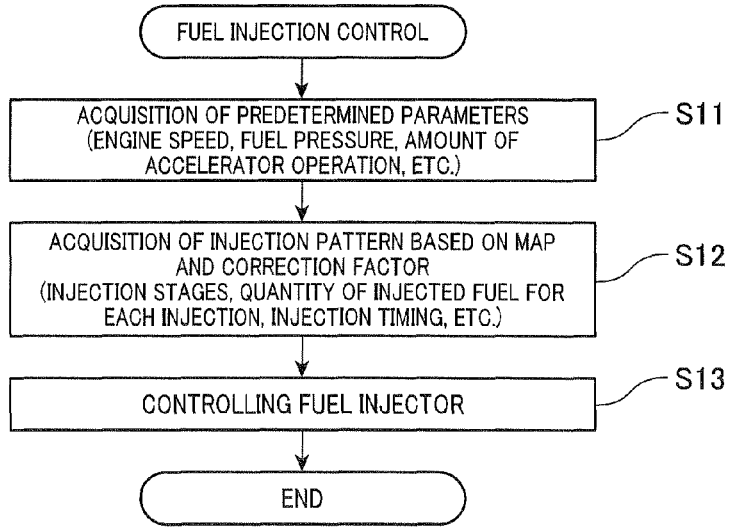
FIG. 2 shows a flow chart of a fundamental procedure of fuel injection control processing.

In the process shown in FIG. 2, first of all, predetermined parameters showing the engine's operational conditions such as the current engine speed, engine load, and pressure of fuel supplied to the fuel injector 10 are acquired in Step S11.

In the following Step S12, an injection pattern is configured based on the various parameters acquired in Step S11.

For example, optimal injection patterns according to various parameters are beforehand stored in a map for injection control, etc., and an optimal target injection pattern is configured with reference to the map based on the parameters acquired in Step S11.

In addition, the target injection pattern is defined by parameters, such as a number of injection stages (number of times of injection in a single combustion cycle), injection starting time, and a period of injection (equivalent to a quantity of fuel being injected), for example.

In this way, the map for injection control shows a relation between these parameters and the optimal injection patterns.

In the following Step S13, an injection commanding signal is outputted to the electromagnetic solenoid 13 of the fuel injector 10 based on the target injection patterns configured in Step S12.

The fuel injection is controlled so that it becomes the optimal injection pattern according to the various parameters (engine's operational conditions) acquired at Step S11.

However, it is concerned that the actual injection pattern injected from the injection hole 11b would shift from the target injection pattern because of the aged deterioration of the fuel injector 10 or the individual differences between individual fuel injectors 10.

To this concern, since an actual injection pattern (actual injecting condition) can be detected with a technique mentioned later if based on a detected value of the fuel pressure sensor 20, the injection commanding signal is corrected so that that the detected actual injection pattern may be matched with the target injection pattern.

Moreover, contents of the correction are studied and a studied value is used for calculation of a next injection commanding signal.

Next, with reference to the flow chart shown in FIG. 3, hereinafter will be described a process that detects (calculates) the actual injecting condition based on the detected value of the fuel pressure sensor 20.

Figure 3:
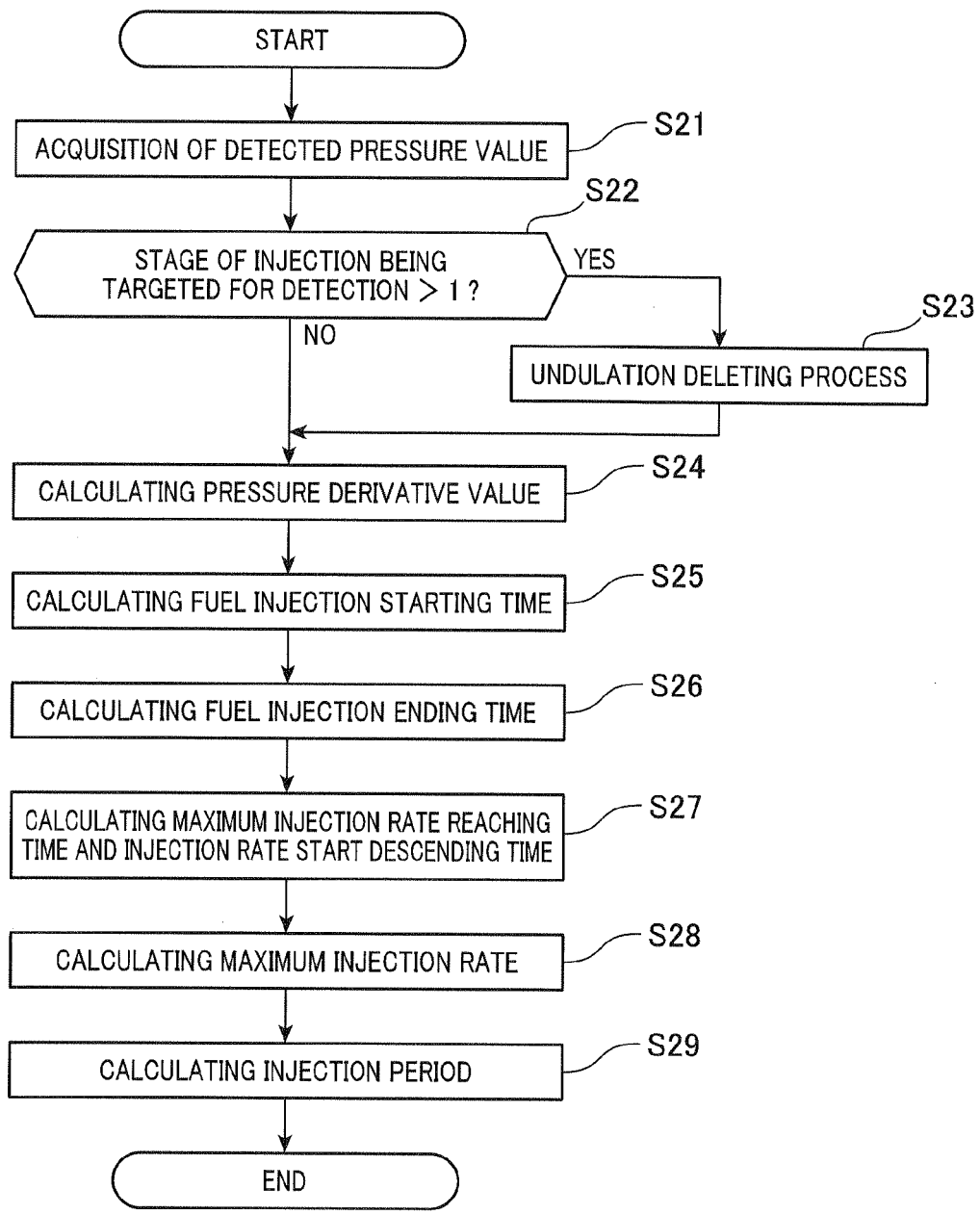
FIG. 3 shows a flow chart of a procedure for detecting a fuel injecting condition.

A series of processes shown in FIG. 3 is performed with a microcomputer of the ECU 30 at a predetermined cycle (an operation cycle that a CPU performs, for example), or every predetermined degree of a crank angle.

First, an output value (detected pressure) of the fuel pressure sensor 20 is acquired at Step S21 (which is a detected waveform acquisition device).

This acquisition process is performed for each of a plurality of fuel pressure sensors 20.

Moreover, it is preferred to perform a filtering process that removes high frequency noise etc. from the acquired detected pressure.

Next, with reference to the time charts shown in FIG. 4A to FIG. 4C, hereinafter will be described an acquisition process of Step S21.

FIG. 4A shows an injection commanding signal outputted to the fuel injector 10 at Step S13 of FIG. 2, and pulse-on of the commanding signal operates the electromagnetic solenoid 13 to open the injection hole 11b.

That is, a start of the injection is commanded by the pulse-on time Is of the injection commanding signal, and an end of the injection is commanded by the pulse-off time Ie.

Therefore, an injection quantity Q (injection period) is controlled by controlling an opening period Tq of the injection hole 11b by the pulse-on period (injection commanding period) of the commanding signal.

FIG. 4B shows a change (transition) of the rate of fuel injection from the injection hole 11b that arises with the injection command, and FIG. 4C shows a change (pressure waveform) of the output value (detected pressure) of the fuel pressure sensor 20 that arises with the change of the rate of the injection.

In addition, FIG. 4A to FIG. 4C show an example of various changes at the time of opening and closing the injection hole 11b once.

Further, the ECU 30 detects the output value of the fuel pressure sensor 20 by a subroutine process other than the process of FIG. 3, and acquires the output value of the fuel pressure sensor 20 one after another by the subroutine process at a short interval (interval shorter than the processing cycle of FIG. 3) to such an extent that a locus (locus shown in FIG. 4C) of a pressure transition waveform is drawn with the sensor output.

Specifically, the sensor output is acquired one after another at an interval shorter than 50 μsec. (preferably shorter than 20 μsec.), and the value acquired one after another in this way is acquired at the Step S21.

Since the pressure waveform and the change of the injection rate that are detected by the fuel pressure sensor 20 have correlation, which is explained below, the transition waveform of the injection rate can be estimated from the detected waveform.

The change of the injection rate shown in FIG. 4B is explained. After starting energizing to the electromagnetic solenoid 13 at the time of Is (reference sign in FIG. 4A), the injection rate starts rising at a turning point R3 in connection with the fuel injected from the injection hole 11b.

That is, actual injection is started. Then the rate reaches the maximum injection rate at a turning point R4, and the rise of the injection rate stops.

This is because the needle valve 20c begins to lift-up at the time of R3, and an amount of lift-up becomes maximum at the time of R4.

It should be appreciated that the term "turning point" in the present specification is defined as follows.

That is, a second-order differential value of the injection rate (or the detected pressure of the fuel pressure sensor 20) is calculated, and an extreme value (a point where a change becomes the maximum) of the waveform that shows a change of the second-order differential value, i.e., a point of inflection of the second floor derivative value waveform, is the turning point of the waveform of the injection rate or the detected pressure.

Next, after disconnecting the energization to the electromagnetic solenoid 13 at the time of Ie, the injection rate starts descending at a turning point R7.

Then, the injection rate becomes zero at a turning point R8, and the actual injection is finished.

This is because the needle valve 20c starts lowering at the time of R7, and the needle valve 20c is completely lowered at the time of R8 and the injection hole 11b is closed.

Explaining the change of the detected pressure of the fuel pressure sensor 20 shown in FIG. 4C, a pressure P0 before a turning point P1 is a fueling pressure in Is at the time of starting the injection command, after driving current flows into the electromagnetic solenoid 13, and before the injection rate starts to rise at R3, the detected pressure descends at the turning point P1.

This is because the control valve 14 opens the leak hole 11d at the time of P1, thus the back pressure chamber 11c in decompressed.

Then, when the back pressure chamber 11c is fully decompressed, the descent from P1 pauses at a turning point P2.

This is because the leak hole 11d is opened completely, thus an amount of leakage becomes fixed according to the diameter of the leak hole 11d.

Next, in connection with the injection rate starting to rise at the time of R3, the detected pressure starts descending at a turning point P3.

Then, the detected pressure stops descending at a turning point P4 in connection with the injection rate reaching the maximum injection rate at the time of R4.

Next, the detected pressure rises at a turning point P5.

This is because the control valve 14 blocks the leak hole 11d at the time of P5, thus the back pressure chamber 11c is compressed.

Then, when the back pressure chamber 11c is fully compressed, the rise from P5 stops at a turning point P6.

Next, in connection with the injection rate starts descending at the time of R7, the detected pressure starts rising at a turning point P7.

Then, in connection with the injection rate becoming zero at the time of R8 and the actual injection is finished, the detected pressure stops rising at a turning point P8.

The detected pressure after P8 repeats descending and rising in a fixed cycle T10 and attenuates.

Thereby, a point R3 where the injection rate starts rising (real injection starting time), a point R4 where the injection rate reaches the maximum, a point R7 where the injection rate starts descending, and a point R8 where the injection rate stops descending, etc. can be estimated by detecting the turning points P3, P4, P7, and P8 among changes in the detected pressure by the fuel pressure sensor 20.

Moreover, based on a correlation of the change in the detected pressure and the change of the injection rate explained below, the change of the injection rate can be estimated from the change in the detected pressure.

That is, a pressure decrease rate $P\alpha$ from the turning point P3 to the turning point P4 of the detected pressure and an injection rate increase rate $R\alpha$ from the turning point R3 to the turning point R4 of the injection rate have correlation.

In addition, a pressure increase rate $P\gamma$ from the turning point P7 to the turning point P8 and an injection rate decrease rate $R\gamma$ from the turning point R7 to the turning point R8 have correlation.

Further, a pressure descending amount $P\beta$ (the amount of maximum pressure descending) from the turning point P3 to the turning point P4 and an injection rate rising amount $R\beta$ (the maximum injection rate) from the turning point R3 to the turning point R4 have correlation.

Therefore, the injection rate increase rate $R\alpha$, the injection rate decrease rate of $R\gamma$, and the maximum injection rate $R\beta$ can be estimated by detecting the pressure decrease rate $P\alpha$, the pressure increase rate $P\gamma$, and the amount of maximum pressure descending $P\beta$ from the change in the detected pressure by the fuel pressure sensor 20.

Accordingly, the various states of the injection rate R3, R4, R7, R8, $R\alpha$, $R\beta$, and $R\gamma$ can be estimated, and therefore, the change (transition waveform) of the rate of the fuel injection shown in FIG. 4B can be estimated.

Furthermore, an integrated value (area of a hatched portion S in FIG. 4B) of the injection rate from a start to an end of the real injection is equivalent to an injection quantity Q.

Moreover, an integrated value of the pressure of a portion (portion of the turning points P3-P8) corresponding to the injection rate change from the start to the end of the real injection and the integrated value S of the injection rate among the change waveforms of the detected pressure have correlation.

Therefore, the injection rate integrated value S equivalent to the injection quantity Q can be estimated by computing a pressure integrated value from the change in the detected pressure by the fuel pressure sensor 20.

Returning to the explanation of FIG. 3, in Step S22, it is decided whether an injection currently being detected is later than the second stage injection among the multi-stage injection.

When the injection is decided as the injection after the second stage (S22: YES), an undulation deleting process (explained below) to the waveform (pressure waveform) of the detected pressure value acquired at Step S21 is applying in the following Step S23.

FIG. 5A is a time chart that shows the driving current that flows into the electromagnetic solenoid 13 when the injection commanding signal is outputted so that the multi-stage (here two stages) injection is performed, and FIG. 5B shows the waveform (detected waveform W) of the fuel pressure detected when the commanding signal of FIG. 5A is outputted.

Moreover, FIG. 5C is a time chart that shows the driving current that flows into the electromagnetic solenoid 13 when the injection commanding signal is outputted so that a single stage injection is performed and FIG. 5D shows the pressure waveform detected when the commanding signal of FIG. 5C is outputted.

In a waveform of a portion corresponding to the n th time injection (target injection) in the detected waveforms W shown in FIG. 5B (refer to a waveform inside the alternate long and short dash line in FIG. 5B), the tail caused by an injection before the n th time (the n−1 th time injection, the n−2 th time injection, the n−3 th time injection) is overlapped.

Explaining the tail of the n−1 th time injection shown in FIG. 5D as an example, an undulation waveform (refer to a waveform inside the alternate long and short dash line in FIG. 5D) that repeats descending and rising in a fixed cycle (T10 in FIG. 4C) and attenuates as time progresses after the n−1 th time injection is finished.

This tail (undulation waveform) overlaps on the waveform of the portion corresponding to the n th time injection (refer to the waveform inside the alternate long and short dash line in FIG. 5B) in the detected waveform W of the n th time injection.

Therefore, when trying to estimate the injection rate change (a transition waveform of the injection rate shown in FIG. 4B) that relates to the n th time injection using the detected waveform W as it is, it is estimated that an error will become very large.

Then, a process that extracts the pressure waveform Wn (refer to FIG. 5F) caused by the n th time injection by deducting the tail (undulation waveform) of a preceding stage injection from the detected waveform W is performed in the undulation deleting process of Step S23.

Specifically, the single stage injections of various modes are examined beforehand, and the undulation waveform for every mode of the injection is acquired.

As examples of the various modes mentioned above, the fuel pressure (supplied fuel pressure) at the beginning of the injection equivalent to P0 (or P2) of FIG. 4C, or to change variously injection conditions such as the quantity of the injection equivalent to the valve opening period Tq can be mentioned.

The undulation waveform obtained by the examination or a waveform expressed by formula for the obtained undulation waveform is equivalent to a "model waveform", and the model waveform for every various modes is memorized (stored) beforehand in a memory (model waveform memorizer) of the ECU 30.

While the undulation waveform shown in the following formula 1 is memorized as the model waveform, the maximum injection rate RβM in the injection corresponding to the model waveform is memorized in the present embodiment.

In addition, p in the formula 1 denotes a value (standard value of the detected pressure by the fuel pressure sensor 20) of the model waveform.

Moreover, $Ai$, $ki$, $\omega i$, and $\theta i$ in the formula 1 are parameters that denote amplitude in a damped oscillation, a damping factor, frequency, and a phase, respectively.

Further, t in the formula 1 denotes elapsed time.

Furthermore, the standard value p of the detected pressure is specified by the formula 1 by making lapsed time t into a variable, and each above-mentioned parameter $Ai$, $ki$, $\omega i$, and $\theta i$ is configured as a different value according to the injection modes (for example, the fuel pressure at the beginning of the injection, the injection period, etc.). In addition, i has a value of 1, 2 or 3.

Figure 6:
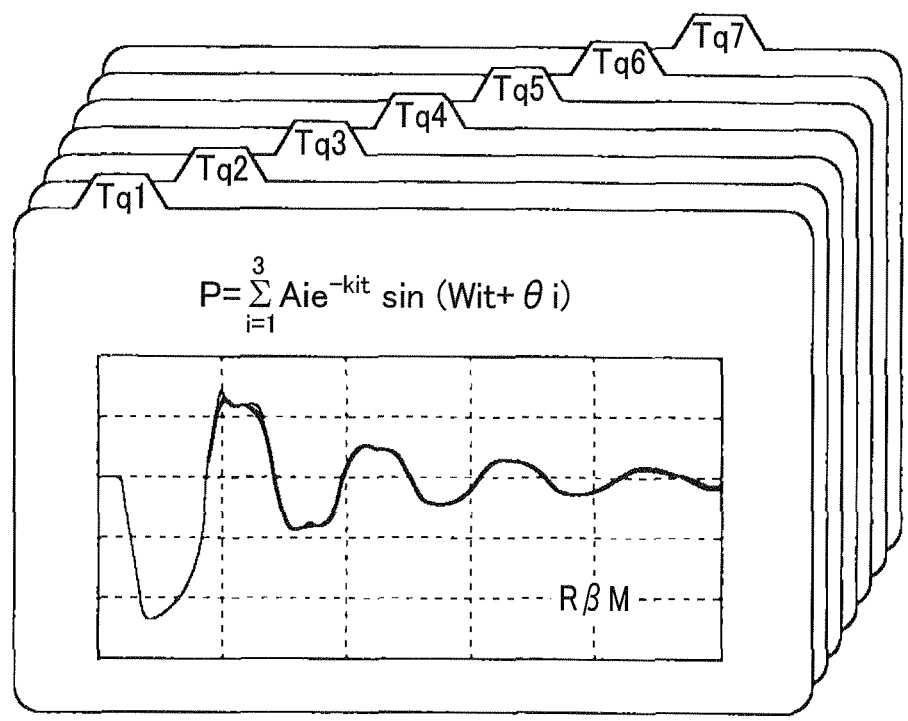
FIG. 6 shows a schematic diagram of a parameter of a model waveform and a maximum injection rate.

Here, as shown in FIG. 6, each above-mentioned parameter $Ai$, $ki$, $\omega i$ and $\theta i$, and the maximum injection rate Rβm are configured according to the injection period (Tq1, Tq2, Tq3).

Furthermore, each parameter $Ai$, $ki$, $\omega i$ and $\theta i$, and the maximum injection rate RβM are configured according to the fuel pressure at the beginning of the injection.

$$p = \Sigma Ai \times \exp(-ki \times t)\sin(\omega i \times t + \theta i)$$  [Formula 1]

Further, when the model waveform CALn-1 that is to become a standard of the tail (undulation waveform) of the n-1 th time injection is needed to be acquired, for example, the model waveform that has an injection mode closest to the model waveform for each of various modes memorized in the memory is selected based on the injection modes such as the fuel pressure and the injection period (injection quantity) at the beginning of the injection of the n-1 th time injection, or the model waveform is calculated based on the difference between the injection mode of the n-1 th time injection and the mode memorized in the memory.

Then, the selected model waveform is acquired as the model waveform CALn-1 used as the standard of the tail (undulation waveform) of the n-1 th time injection.

For example, a dashed line in FIG. 5E denotes the model waveform CALn-1, and a solid line in FIG. 5E denotes the detected waveform W of FIG. 5B.

Then, the pressure waveform Wn shown in FIG. 5F is extracted by deducting the model waveform CALn-1 from the detected waveform W.

Since the undulation waveform element of the preceding stage injection is removed, the pressure waveform Wn extracted in this way should serve as a pressure waveform with high correlation with the injection rate change resulting from the n th time injection.

Although only the model waveform CALn-1 denoting the undulation waveform of the n-1 th time injection is deducted from the detected waveform W in the example shown in FIG. 5E and FIG. 5F, the model waveform may be similarly acquired for a plurality of undulation waveforms before the n-2 th time injection, and a plurality of acquired model waveforms may be deducted from the detected waveform W.

Incidentally, in an example shown in FIG. 7A to FIG. 7E, the undulation waveforms (model waveforms CALn-1, CALn-2) of the n-1 th time injection and the n-2 th time injection are deducted from the detected waveform W.

Here, the inventor of the present application has discovered that a degree to which a pulsating amplitude A1 of detected waveform W0n-1 decays changes according to an injection interval Tmn from the m th time injection (=the n-1 th time) to the n th time injection.

A relation between the injection interval Tmn and a attenuating degree is shown in FIG. 8A, FIG. 8B, and FIG. 8C.

As shown in FIG. 8A, FIG. 8B, and FIG. 8C, a fuel pressure change Cn-1 arises due to the n-1 th time injection in a detected waveform W0n-1 of the n-1 th time injection.

Moreover, in the detected waveform W0n of the n th time injection, the fuel pressure change Cn arises due to the n th time injection.

The drawings are arranged in order of FIG. 8A, FIG. 8B, and FIG. 8C where FIG. 8A has the longest injection interval Tmn (Tmn1>Tmn2>Tmn3).

In FIG. 8A and FIG. 8C, the fuel pressure change Cn due to the n th time injection is overlapped with a bottom portion of the detected waveform W0n-1.

For this reason, the pressure of the pressure wave emerging from the injection hole 11b of the fuel injector 10 at the n th time injection becomes a minimum value, and an attenuating degree of the amplitude of the detected waveform W0n-1 becomes large compared with model waveform CALn-1 before the correction.

On the other hand, in FIG. 8B, the fuel pressure change Cn due to the n th time injection is overlapped with a portion between a peak and the bottom portions of the detected waveform W0n-1.

For this reason, the pressure of the pressure wave escaped from the injection hole 11b of the fuel injector 10 at the n th time injection becomes as a center value (value of the point of inflection) of the pressure that changes, and an attenuating degree of the amplitude of the detected waveform W0n-1 becomes small compared with model waveform CALn-1 before the correction.

In the present embodiment in view of the above, the model waveform CALn-1 selected like above is corrected to the waveform that is attenuated by an attenuating degree according to the injection interval Tmn from the m th time injection to the n th time injection.

Specifically, the standard value p (model waveform CAL) is corrected by multiplying the standard value p of the formula 1 by a first correction factor ξ.

The first correction factor ξmn applied to the pulsation by the n-1 th time injection is a function of the injection interval Tmn.

In the example of FIG. 7C and FIG. 7D, the model waveforms CALn-1 and CALn-2 that shown in the solid lines in the drawings show the waveform after the correction so that the attenuating degree may be enlarged.

In addition, dashed lines k1 in the drawings denote an asymptote in alignment with a peak value of the model waveform after the correction, and alternate long and short dash lines k2 in the drawings denote the asymptote in alignment with the peak value of the model waveform before the correction.

Moreover, when the first correction factor by which the standard value p of the formula 1 is multiplied is changed, inclination of the asymptotes k1 and k2 change.

That is, when the first correction factor $\xi$ is reduced in order to enlarge the attenuating degree, the asymptote k2 before correction is corrected so that the inclination becomes large, as shown in k1.

Moreover, it becomes clear by performing the following examinations that the longer the injection period Tqn of the n th time injection, the pulsating amplitude A1 of the detected waveform W0n-1 becomes smaller.

That is, since the amount of a fuel pressure undulation reflected in the injection hole at the time of injection decreases, the longer the opening period of the valve, the amplitude of the pulsation becomes smaller.

Figure 9:
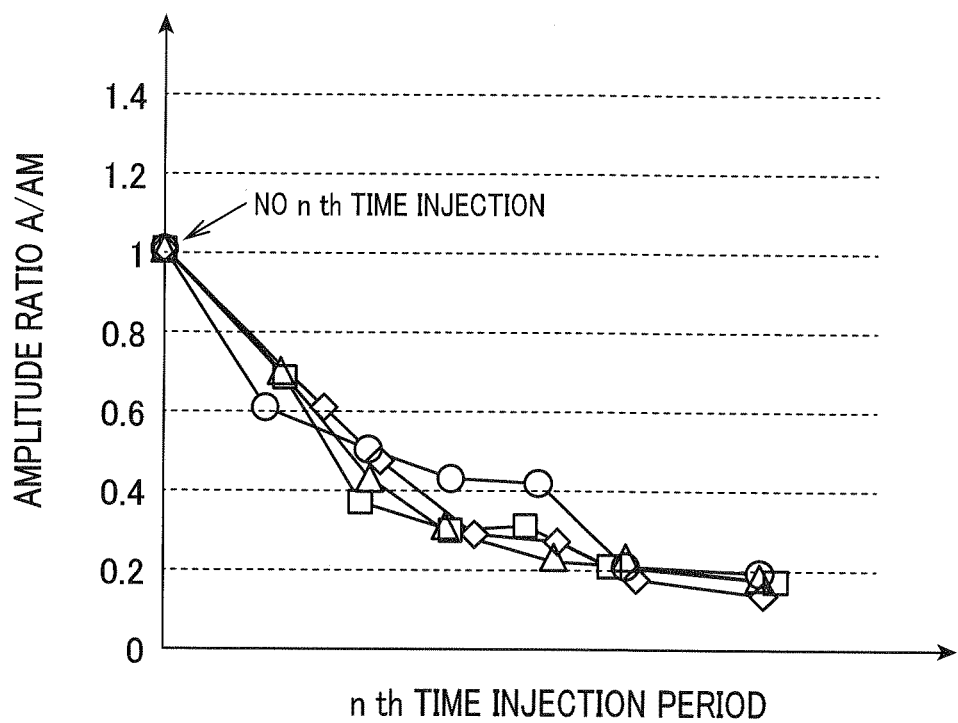
FIG. 9 shows a graph of a relation between an injection period and an amplitude ratio.

In this experiment, how an amplitude ratio A/AM of an amplitude A of a real waveform and an amplitude AM of a model waveform changes the n th time injection period is examined, and a result of the examination shown in a graph of FIG. 9.

In addition, a plurality of lines in the graph denote the result of the examination with the pressure of the fuel supplied to the fuel injector changed to 200 MPa, 140 MPa, 80 MPa, and 40 MPa.

The result of the examination shown in FIG. 9 shows that the longer the injection period Tqn of the n th time injection, the pulsating amplitude A of the detected waveform W0n-1 becomes smaller regardless of the supplied fuel pressure.

Incidentally, when n th time injection is not performed (the value of the injection period Tqn is zero), the amplitude ratio A/AM is one, and this means that the pulsating amplitude A1 of the detected waveform W0n-1 is getting smaller in the influence by performing the n th time injection.

According to the knowledge mentioned above, a process for correcting the model waveform CALn-1 selected accordingly to a waveform with a larger attenuating degree as the injection period Tqn of the n th time injection is longer.

Specifically, the first correction factor $\xi$mn to the pulsation by the m (=n-1) time injection is also a function of the injection period Tqn.

Moreover, the standard value p (model waveform CAL) is corrected by multiplying the standard value p of the formula 1 by the first correction factor $\xi$.

For this reason, the model waveform CALn-1 can be brought close to the detected waveform W0n-1 obtained by deducting the detected waveform W0n at the time of n th single stage injection from the detected waveform W during the multi-stage injection.

Furthermore, it becomes clear that the larger the maximum injection rate R$\beta$m in the m (=n-1) th time injection, the larger the pulsating amplitude A1 of the detected waveform W0m.

That is, since the larger the maximum injection rate in the injection, the larger the fuel pressure wave motion, therefore the larger the amplitude of the pulsation.

Accordingly, the present embodiment defines the maximum injection rate ratio R$\beta$/R$\beta$M of the maximum injection rate R$\beta$ of the real waveform and the maximum injection rate R$\beta$M of the model waveform, and the standard value p is corrected using a second correction factor $\eta$ to which the maximum injection rate ratio R$\beta$/R$\beta$M is adapted by the conformity factor $\gamma$.

The second correction factor $\eta$m to the pulsation of the m th time injection is denoted by the following formula 2.

$$\eta m = \gamma\{R\beta m/R\beta Mm(Tqm)-1\}+1 \qquad \text{[Formula 2]}$$

In addition, the standard value p (model waveform) is corrected by multiplying the standard value p of the formula 1 by the second correction factor q.

The second correction factor $\eta$m is a function of the actual maximum injection rate R$\beta$m in the m th time injection.

Moreover, the maximum injection rate R$\beta$Mm of the model waveform in the m th time injection is a function of the injection period Tqm in the m th time injection.

The injection period Tqm can be calculated by analyzing the pressure waveform resulting from the m th time injection, and can also be calculated from a pulse-on period (injection commanding period) in the m th time injection.

Based on the above, the model waveform CALAn of the pulsation caused by all the injections before the n th time injection remaining at the n th time injection is denoted by the following formula 3.

$$CALAn = \Sigma(\pi\xi ji) \times \eta i \times CALi \qquad \text{[Formula 3]}$$

Here, sigma ($\Sigma$) denotes the summation until i=1 to m, and pi ($\pi$) takes the product until j=i+1~n.

That is, the formula 3 denotes the total corrected by the first correction factor $\pi\xi ji$ and the second correction factor $\eta i$ (ratio) to the model waveform CALi of the 1~m th time injection.

In addition, since the correction by an injection interval of the injection period of the j th injection and the i+1 th injections is performed on every injection after the i+1 th stage (the j-th injection), $\xi$ becomes a form of a product.

Returning to the explanation of FIG. 3, in Step S24 following the undulation deleting process in Step S23, when an injection being targeted for the detection is decided as an injection of the first stage (S22: NO), a waveform of a pressure derivative value is acquired by differentiating the detected pressure value (pressure waveform) acquired in Step S21.

When an injection being targeted for the detection is an injection after the second stage (S22: YES), the detected pressure value (pressure waveform) that the undulation is deleted in Step S23 is differentiated.

In the following Steps S25 to S28, the various injecting conditions shown in FIG. 4B are calculated using the pressure derivative value acquired in Step S24.

That is, the fuel injection starting time R3 is calculated in Step S25, the injection ending time is calculated in Step S26, the time where the maximum injection rate is reached R4 and the time where the injection rate starts descending R7 are calculated in Step S27, and the maximum injection rate R$\beta$ is calculated in Step S28, respectively.

In addition, when the amount the fuel injected is small, the time where the maximum injection rate is reached R4 and the time where the injection rate starts descending R7 will match.

Then, in the following Step S29, the injection period Tq from a real injection start to an end is calculated based on the injecting conditions R3, R8 R$\beta$, R4, and R7 calculated in Steps S25 to S28.

Moreover, the integrated value (area of the hatched portion S in FIG. 4B) of the injection rate from the real injection start to the end is calculated, and the calculation result is assigned as an actual injection quantity Q.

When the amount the fuel injected is large, the area S becomes a form close to a trapezoid, and when the amount the fuel injected is small, the area S becomes a form close to a triangle.

In addition, other than the injecting conditions R3, R8, Rβ, R4, and R7 mentioned above, the integrated value S of the injection rate (injection quantity Q) may be calculated by first calculating an increase rate Rα of the injection rate and a decrease rate Rγ of the injection rate from the pressure waveform, then these increase rate Rα and the decrease rate Rγ are considered for the calculation.

Next, procedure of the deleting undulation process S23 mentioned above is explained using the flow chart of FIG. 10.

This process is a subroutine process corresponding to Step S23 of FIG. 3, and first acquires the fuel pressure at the beginning of the injection P0m and the injection period Tqm of the m (=n−1) th time in Step S31.

In addition, the injection period Tqm calculated in Step S29 of FIG. 3 may be used for the injection period Tqm, and the opening period Tqm of the injection hole 11b according to the injection commanding signal may also be used.

In the following Step S32, based on the fuel pressure at the beginning of the injection P0m and the injection period Tqm acquired in Step S31, the model waveform CALm that has an injection mode closest to the model waveform for every various modes memorized in the memory is selected, or the model waveform is calculated based on the difference of the injection mode of the m th time injection and the mode memorized in the memory.

Moreover, the maximum injection rate RβMm in the injection corresponding to the model waveform CALm is acquired.

In the following Step S33, the model waveform CALi, ξi, and ηi (i=1 to m−1) that are saved in Step S38 (mentioned later) at the m th time injection are acquired.

In the following Step S34, the injection interval Tin of the i th time injection and the n th time injection and the injection period Tqn of the n th time injection are called, and in Step S35, the first correction factor ξi is calculated for i=1 to m based on Tin(i=1 to m) and Tqn.

In addition, the injection interval Tin may be calculated based on the injection starting time calculated at Step S25 of FIG. 3 and the injection ending time calculated at Step S26, or may be calculated based on the injection commanding signal.

Moreover, Tqn uses the valve opening period Tqn according to the injection commanding signal.

Here, although Tqi for ξ is always calculated based on an injection commanding signal in order to obtain ξ for every injection in recurrence formula, it may be obtained as as piξij like the formula 3.

In that case, Tqi (i=1 to m) can also use the result of Step S29 except for the injection period Tqn of the target injection.

In the following Step S36, the second correction factor ηm is calculated based on the actual maximum injection rate Rβi in the m th time injection and the maximum injection rate RβMm of the model waveform.

In addition, the maximum injection rate calculated at Step S28 of FIG. 3 is used for the actual maximum injection rate Rβi.

In the following Step S37 (corrector), the model waveform CALAn of the remaining pulsation at the n th time injection caused in all the injections before the n th time injection is calculated by the formula 3 mentioned above.

That is, by using CALi, ξi, and ηi (i=1 to m) acquired in the Steps S32 to S36, the model waveform CALAn of the remaining pulsation at the n th time injection, on other words, the model waveform CALAn of all the pulsation overlapping the detected waveform W during the multi-stage injection will be calculated.

In the following Step S38, CALm ξi (i=1 to m), and ηm newly calculated in Steps S32, S35, and S36 are stored in the memory.

In the following Step S39 (waveform extractor), the model waveform CALAn (the model waveform after the correction) of the pulsation calculated is Step S37 is subtracted from the detected waveform W acquired in Step S21 of FIG. 3.

The waveform obtained by this subtraction is equivalent to the pressure waveform Wn resulting from the n th time injection shown in FIG. 5F or FIG. 7E.

Figure 11:
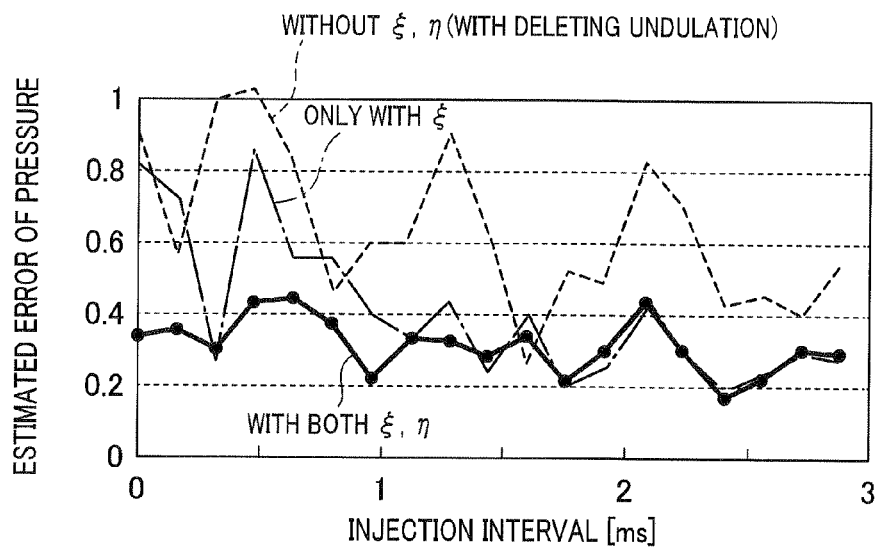
FIG. 11 shows a graph of a relation between the injection interval and an error of pressure measurement.

FIG. 11 shows a graph of an estimated error of the pressure when processing the undulation deleting in cases of having no correction by the first correction factor ξ and the second correction factor η (dashed lines), having a correction by the first correction factor ξ only (dashed lines with dots), and having correction by both the first correction factor ξ and the second correction factor η (solid line).

As shown in FIG. 11, the estimated error of the pressure can be made small by performing the correction by the first correction factor ξ, and further by the first correction factor ξ and the second correction factor η.

The present embodiment explained in full detail above has the following advantages.

It is verified by the inventor that when the maximum rate of the injection Rβm in the m (=n−1) th time injection differs, the tail (pulsation of pressure) of the waveform element resulting from the m th time injection also changes.

In this respect, the model waveform CALm used for the extraction is corrected by the second correction factor ηm according to the maximum injection rate Rβm in the m th time injection.

As a result, the pressure waveform resulting from the n th time injection can be extracted from the detected waveform W during the multi-stage injection with high precision.

The larger the maximum injection rate Rβm in the m th time injection, the larger the pulsation of the pressure that remains after the injection.

In this respect, since the larger the maximum injection rate Rβm in the m th time injection, the larger the second correction factor ηm, and so the model waveform CALm used for the extraction can be corrected appropriately.

The maximum descent amount of the fuel pressure in the pressure waveform resulting from the m th time injection has a correlation with the maximum injection rate Rβm in the m th time injection.

Therefore, when assigning that the maximum descent amount of the fuel pressure as a correlation value of the maximum injection rate Rβm, the model waveform CAL used for the extraction can be corrected appropriately even if the correlation value and therefore the second correction factor ηm are large.

It is verified by the inventor that when the injection interval Tmn from the m th time injection to the n th time injection differs, the tail of the waveform element resulting from the m th time injection also changes.

In this respect, the model waveform CALm (CALi) used for the extraction is corrected by the waveform attenuated by the first correction factor ξm (ξi) according to the injection interval Tmn from the m th time injection to the n th time injection.

As a result, the pressure waveform resulting from the n th time injection can be extracted from the detected waveform W during the multi-stage injection with high precision.

It is verified by the inventor that when the injection periods Tqn of the n th time injection differ, the tail of the waveform element resulting from the m th time injection also changes.

In detail, the longer the injection period Tqn of the n th time injection, the attenuating degree of the tail of the waveform element becomes large.

In this respect, the model waveform CALm used for the extraction is corrected to a waveform with a larger attenuating degree as the injection period Tqn of the n th time injection gets longer.

As a result, the pressure waveform resulting from the n th time injection can be extracted from the detected waveform W during the multi-stage injection with high precision.

Other Embodiments

The present disclosure is not limited to the disclosed contents of the embodiment, but may be altered and performed as follows.

Moreover, characteristic compositions of each embodiment may be combined arbitrarily.

Figure 10:
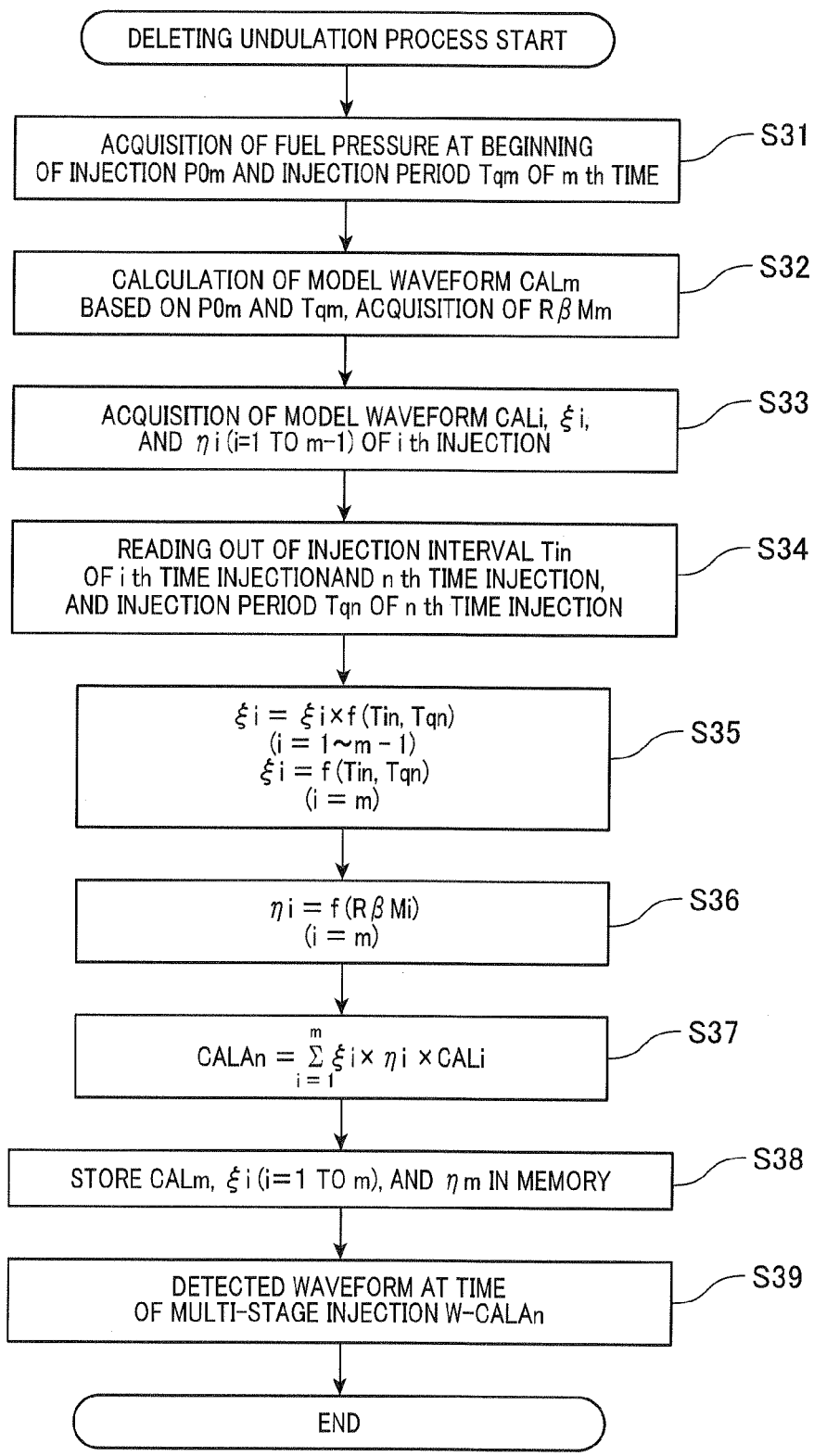
FIG. 10 shows a flow chart of a detailed procedure of processes of deleting undulation shown in FIG. 3.

In the process of Step S37 in FIG. 10, when computing the model waveform CALAn of the pulsation that remains at the n th time injection resulting from all the injections before the n th time injection, the process of Step S22 in FIG. 3 can be omitted if the model waveform CALA1 of the pulsation that remains at the first injection is set to 0 (CALA1=0).

Figure 12:
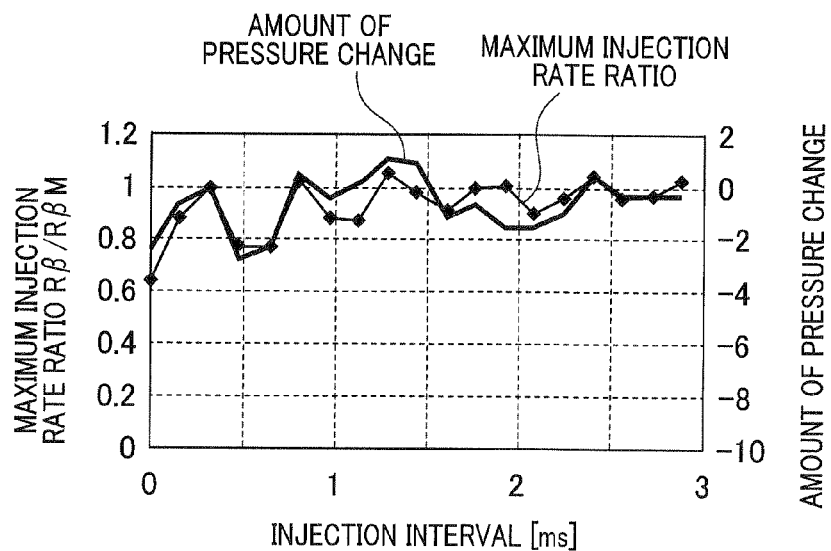
FIG. 12 shows a graph of a relation between the injection interval, a maximum injection rate ratio, and an amount of pressure changes.

As shown in FIG. 12, it is known that the maximum injection rate ratio Rβ/RβM of the maximum injection rate Rβ of the real waveform and the maximum injection rate RβM of the model waveform is correlated with the amount of change from the reference pressure (the rail pressure Pc and detected pressure at the time of not injecting) by the tail of the pressure waveform to which the fuel pressure at the time of injection resulting from all the injections before.

That is, the amount of change (the amount of change from the reference pressure) from which the fuel pressure at the m th time injection changed is correlated with the maximum injection rate ratio Rβ/RβM (maximum injection rate Rβ) in the m th time injection by the pressure waveform resulting from all the injections before the m (=n−1) th time injection.

Then, $\eta m$ of the embodiment may be calculated using the model waveform CALm resulting from all the injections before the m th time injection.

Specifically, $\eta m$ is calculated with the following formula 4.

$$\eta m = \epsilon \times \xi \times CALm + 1 \quad [\text{Formula 4}]$$

Here, $\epsilon$ is a conformity factor.

The injection interval of a pre-injection and the m th time injection and a period until it becomes the maximum injection rate from the beginning of the injection in the m th time injection are totaled, and the standard value p when the total period passes is used as a value for the model waveform CALm.

Then, calculated $\eta m$ may be used for the undulation deleting process of FIG. 10.

Therefore, the model waveform used for extraction can be corrected appropriately.

Although the first correction factor $\xi m$ is made into the function of the injection interval Tmn and the injection period Tqn, the first correction factor $\xi m$ can also be made into the function of either one of the injection interval Tmn and the injection period Tqn in the present embodiment.

Although the model waveform CAL is corrected using the first correction factor $\xi$ and the second correction factor $\eta$, the model waveform CAL can also be corrected using either one of the first correction factor $\xi$ and the second correction factor $\eta$ in the present embodiment.

The model waveform CAL in the present embodiment is denoted by the formula 1, and each parameter Ai, ki, ωi, and θi is configured to a different value according to the injection modes (the fuel pressure at the beginning of the injection, the injection period, etc., for example) and memorized so that the standard value p of detected pressure can be calculated from the formula 1 with a lapsed time t as a variable.

On the other hand, the standard value p of the detected pressure to the lapsed time t may be stored as it is in a map etc., and the map may be used as the model waveform by storing the map for every injection mode.

The fuel injector 10 to which the present embodiment is applied employs a two-way valve system for the control valve 14 so that the fuel in the back pressure chamber 11c always leaks during the injection period when the needle 12 is opened.

However, the present disclosure is applicable also to the fuel injector that employs a three-way valve system for the control valve 14 and does not let leak the fuel in the back pressure chamber 11c during the injection period.

What is claimed is:

1. A fuel pressure waveform acquisition device applied to a fuel injection system that has a fuel injector that injects fuel for combustion in an internal-combustion engine from an injection hole, and a fuel pressure sensor that detects a change of a fuel pressure in a fuel path to the injection hole that changes resulting from the injection of the fuel from the injection hole, comprising:
   a detected waveform acquisition device that acquires a pressure waveform detected by the fuel pressure sensor while performing a multi-stage injection that injects the fuel a plurality of times per one combustion cycle of the internal-combustion engine as a detected waveform at the time of the multi-stage injection;
   a model waveform memorizer where a model waveform, which is used as a standard of the pressure waveform when an injection that is preceding a target injection is performed without performing the target injection, is memorized when any one of an injection of a second stage or later is considered as the target injection among multi-stage injections;
   a waveform extractor that extracts the pressure waveform resulting from the target injection by deducting the model waveform from the detected waveform at the multi-stage injection;
   a corrector that corrects the model waveform used for an extraction by a ratio according to a maximum injection rate in the injection of the preceding stage; and
   the larger maximum injection rate in the injection of the preceding stage, the more the corrector enlarges the ratio.

2. The fuel pressure waveform acquisition device according to claim 1, wherein,
   the corrector further corrects the model waveform used for the extraction to the waveform that is attenuated by an attenuating degree according to an injection interval from the injection of the preceding stage to the target injection.

3. The fuel pressure waveform acquisition device according to claim 1, wherein,
   the longer the injection period of the target injection, the more the corrector corrects the model waveform used for the extraction to the waveform with the larger attenuating degree.

4. A fuel pressure waveform acquisition device applied to a fuel injection system that has a fuel injector that injects fuel for combustion in an internal-combustion engine from an injection hole, and a fuel pressure sensor that detects a change of a fuel pressure in a fuel path to the injection hole that changes resulting from the injection of the fuel from the injection hole, comprising:

- a detected waveform acquisition device that acquires a pressure waveform detected by the fuel pressure sensor while performing a multi-stage injection that injects the fuel a plurality of times per one combustion cycle of the internal-combustion engine as a detected waveform at the time of the multi-stage injection;
- a model waveform memorizer where a model waveform, which is used as a standard of the pressure waveform when an injection that is preceding a target injection is performed without performing the target injection, is memorized when any one of an injection of a second stage or later is considered as the target injection among multi-stage injections;
- a waveform extractor that extracts the pressure waveform resulting from the target injection by deducting the model waveform from the detected waveform at the multi-stage injection;
- a corrector that corrects the model waveform used for an extraction by a ratio according to a maximum injection rate in the injection of the preceding stage;
- the correlation value is a maximum descent amount of the fuel pressure in the pressure waveform resulting from the injection of the preceding stage; and
- the larger the correlation value, the more the corrector enlarges the ratio.

\* \* \* \* \*